United States Patent
Hsiao et al.

(10) Patent No.: US 10,241,471 B2
(45) Date of Patent: Mar. 26, 2019

(54) AUTOFOCUS SYSTEM AND METHOD IN DIGITAL HOLOGRAPHY

(71) Applicants: IMEC TAIWAN CO., Hsinchu (TW); IMEC VZW, Leuven (BE)

(72) Inventors: Ching-Chun Hsiao, Bade (TW); Ting-Ting Chang, Tainan (TW); Chao-Kang Liao, New Taipei (TW)

(73) Assignees: IMEC TAIWAN CO., Hsinchu (TW); IMEC VZW, Leuven (BE)

( * ) Notice: Subject to any disclaimer, the term of this patent is extended or adjusted under 35 U.S.C. 154(b) by 74 days.

(21) Appl. No.: 15/528,202

(22) PCT Filed: Nov. 30, 2015

(86) PCT No.: PCT/EP2015/078089
§ 371 (c)(1),
(2) Date: May 19, 2017

(87) PCT Pub. No.: WO2016/083620
PCT Pub. Date: Jun. 2, 2016

(65) Prior Publication Data
US 2017/0322516 A1    Nov. 9, 2017

(30) Foreign Application Priority Data

Nov. 28, 2014    (TW) .............................. 103141335 A

(51) Int. Cl.
*G03H 1/04*    (2006.01)
*G03H 1/08*    (2006.01)
(Continued)

(52) U.S. Cl.
CPC ............. *G03H 1/0866* (2013.01); *G06T 7/11* (2017.01); *G06T 7/13* (2017.01); *G03H 1/0443* (2013.01);
(Continued)

(58) Field of Classification Search
CPC .............. G03H 1/0866; G03H 1/0443; G03H 2001/0883; G03H 2001/0447; G06T 7/13; G06T 7/11; G06T 7/187; G06T 7/136
(Continued)

(56) References Cited

U.S. PATENT DOCUMENTS

| 2016/0132021 A1* | 5/2016 | Zschau | ................ G03H 1/0808 359/9 |
| 2016/0187850 A1* | 6/2016 | Oh | ........................ H04N 19/124 359/9 |

OTHER PUBLICATIONS

Bueno-Ibarra, Mario A. et al., "Fast Autofocus Algorithm for Automated Microscopes", Optical Engineering, vol. 44, No. 6, Jun. 2005, pp. 1-8.
(Continued)

*Primary Examiner* — Jade R Chwasz
(74) *Attorney, Agent, or Firm* — McDonnell Boehnen Hulbert & Berghoff LLP

(57) ABSTRACT

At least one embodiment relates to an autofocus method for determining a focal plane for at least one object. The method includes reconstructing a holographic image of the at least one object such as to provide a reconstructed image at a plurality of different focal depths. The reconstructed image includes a real component and an imaginary component. The method also include performing a first edge detection on the real component for at least two depths of the plurality of different focal depths and a second edge detection on the imaginary component for the at least two depths. Further, the method includes obtaining a first measure of clarity for each of the at least two depths based on a first measure of statistical dispersion with respect to the first edge detection and a second measure of clarity.

20 Claims, 7 Drawing Sheets

(51) Int. Cl.
*G06T 7/11* (2017.01)
*G06T 7/13* (2017.01)
*G06T 7/136* (2017.01)
*G06T 7/187* (2017.01)

(52) U.S. Cl.
CPC ............... *G03H 2001/0447* (2013.01); *G03H 2001/0883* (2013.01); *G06T 7/136* (2017.01); *G06T 7/187* (2017.01)

(58) Field of Classification Search
USPC .................................... 359/9, 10, 32, 35, 21
See application file for complete search history.

(56) References Cited

OTHER PUBLICATIONS

PCT International Search Report and Written Opinion, PCT International Application No. PCT/EP2015/078089, dated Feb. 11, 2016, 11 pages.

Mudanyali, Onur et al., "Detection of Waterborne Parasites Using Field-Portable and Cost-Effective Lensfree Microscopy", Lab on a Chip, vol. 10, No. 18, Jan. 1, 2010, pp. 2419-2423.

Pan, Gang et al., "Digital Holography of Particle Fields: Reconstruction by Use of Complex Amplitude", Applied Optics vol. 42, No. 5, Feb. 10, 2003, pp. 827-833.

Langehanenberg, Patrik et al., "Autofocusing in Digital Holographic Phase Contrast Microscopy on Pure Phase objects for Live Cell Imaging", Applied Optics, vol. 47, No. 19, Jul. 1, 2008, pp. D176-D182.

\* cited by examiner

AUTOFOCUS SYSTEM AND METHOD IN DIGITAL HOLOGRAPHY

CROSS-REFERENCE TO RELATED APPLICATION

The present application is a national stage entry of PCT/EP2015/078089 filed Nov. 30, 2015, which claims priority to TW 103141335 filed on Nov. 28, 2014, the contents of each of which are hereby incorporated by reference.

FIELD OF THE DISCLOSURE

The disclosure relates to the field of digital holographic image processing. More specifically, it relates to an autofocus system and method for image processing in digital holography.

BACKGROUND

Lens-free holographic imaging may provide a low-cost solution for imaging small objects, as it typically does not require expensive or complex optical components. Lens-free holographic imaging may also provide a relatively large field of view when compared with compact conventional microscopes using lenses. Furthermore, holographic imaging allows good depth of field imaging, such that a large volume can be imaged by a single image acquisition.

However, in many cases, such as in automatic inspection of objects, the distance between the object of interest and the image detector is not known in advance, e.g. this distance can be variable and may have a significant stochastic component. Conventional digital holographic reconstruction algorithms, e.g. using forward and backward propagation of the optical fields, may typically require such focal distance to be provided as a parameter to obtain a high quality reconstruction. Since an incorrect focus may result in blurred images and may cause difficulties in specific applications, such as cell behavior analysis, it may be desirable to use a method to find optimized focal planes automatically, and to provide a corresponding autofocus system.

Conventional techniques use scalar images comprising gradient magnitude values as function of image coordinates to determine a suitable focal plane for an object of interest in lens-free holographic imaging. Such approaches may be based on spatial gradient analysis of holographic reconstruction images consisting of reconstructed wave amplitude values or relates quantities, e.g. scalar image intensities. Such methods may thus be characterized as amplitude-based approaches.

For example, in a paper entitled "Detection of Waterborne Parasites Using Field-Portable and Cost-Effective Lensfree Microscopy" by Onur Mudanyali et al., an amplitude image is determined based on an image gradient magnitude as function of two-dimensional image coordinates, wherein the image gradient is approximated by horizontal and vertical Sobel operator convolutions of a reconstructed image. The variance of this amplitude image is used as a focus measure, where this focus measure reaches a maximum at a reconstruction focal distance where good sharpness and contrast are obtained.

In a paper entitled "Fast Autofocus Algorithm for Automated Microscopes" by Mario A. Bueno-Ibarra et al., a focus measure is determined for images obtained by conventional microscopic imaging at different focal distances. The present disclosure describes a focus measure based on the variance of the magnitude of the Sobel-Tenengrad gradient (SOB VAR). The disclosure also describes a focus measure based on the variance of the absolute value of the convolution of the image with a discrete Laplace operator (LAP VAR).

While such amplitude-based approaches are widely used, scalar focus measures determined from scalar images obtained by manipulation of image derivatives may include a global search in the entire depth range of interest is conducted to determine an optimized focal plane by maximization of the scalar focus measure. Therefore, narrowing the search range down may allow speed to be improved.

SUMMARY

Various embodiments provide a good and efficient autofocus methods and corresponding autofocus systems.

The above objective is accomplished by a method and device according to example embodiments.

In some embodiments, no mechanical focus devices may be used.

In some embodiments, off-line computational image focusing can be achieved.

In some embodiments, a short image acquisition time can be obtained, e.g. because no mechanical focusing may be required.

In some embodiments, a search range of a focal distance can be quickly narrowed down in an automatic optical inspection process.

In some embodiments, only a few iterations of holographic image reconstruction are used to obtain a reconstructed image that is a sharp, clear, and well-focused image of an object of interest.

In a first aspect, the disclosure relates to an autofocus method, e.g. a computer-implemented autofocus method, for determining a focal plane, e.g. an optimized focal plane, for at least one object, e.g. in a reconstructed holographic image. The method comprises reconstructing a holographic image of the at least one object such as to provide a reconstructed image at a plurality of different focal depths. For example, the reconstructed image may comprise a plurality of two-dimensional reconstructed holographic images, each corresponding to a different focal depth in which the two-dimensional holographic image is reconstructed. The reconstructed image comprises a real component and an imaginary component for jointly encoding phase and amplitude information, e.g. the reconstructed image is a complex-valued image representing both phase and amplitude information of a wavefront in the focal plane. For example, this wavefront may correspond to an object light wave that has formed interference patterns by interaction with a reference light wave, in which these interference patterns were recorded in a raw holographic image that is reconstructed to form the reconstructed holographic image.

The method further comprises performing a first edge detection on the real component for at least two depths, e.g. performing this first edge detection separately on each of the at least two depths, of the plurality of different focal depths and performing a second edge detection on the imaginary component for the at least two depths, e.g. performing this first edge detection separately on each of the at least two depths.

The method further comprises obtaining a first measure of clarity for each of the at least two depths based on a first measure of statistical dispersion with respect to the first edge detection and a second measure of clarity for each of the at least two depths based on a second measure of statistical dispersion with respect to the second edge detection. The first measure of statistical dispersion and the second measure of statistical dispersion may correspond to the same mathematical operation being applied to respectively the result of the first edge detection and the result of the second edge detection.

The method further comprises determining the focal plane, e.g. the optimized focal plane, for the at least one object based on a comparison of a scalar measure of clarity for the at least two depths, e.g. comparing the value of the scalar measure of clarity between the at least two depths. This scalar measure is based on the first measure of clarity and the second measure of clarity.

A method according to embodiments may further comprise identifying at least one object in the reconstructed image. The steps of performing the first and second edge detection, obtaining the first and second measure of clarity and determining the focal plane may furthermore be applied to a local region of the reconstructed image corresponding to the or each at least one identified object.

In a method according to embodiments, this step of identifying may comprise digitizing the reconstructed image, identifying connected regions having a same digitized value; and segmenting each of the connected regions, e.g. to form the local region of the reconstructed image for each of the identified objects.

In a method according to embodiments, a plurality of objects may be identified, e.g. the at least one object may be a plurality of objects. The method may further comprise determining a plurality of focal planes corresponding to the plurality of objects. The method may further comprise stitching image regions corresponding to each of the plurality of objects in the corresponding focal plane together to form a synthetic image that contains each of the plurality of objects in focus.

In a method according to embodiments, the first measure of statistical dispersion or the second measure of statistical dispersion may be a standard deviation.

Thus, embodiments may provide an autofocus method of determining an optimized focal plane. The method may comprise reconstructing a holographic image, identifying objects in the reconstructed image, performing a first edge detection for an object at a depth based on the real part of the reconstructed image, performing a second edge detection for the object at the depth based on the imaginary part of the reconstructed image, obtaining a first degree of clarity for the object at the depth based on a first standard deviation with respect to the first edge detection, and obtaining a second degree of clarity for the object at the depth based on a second standard deviation with respect to the second edge detection. The method may further comprise determining a degree of clarity for the object at the depth based on the first standard deviation value and the second standard deviation value.

In a method according to embodiments, obtaining a first measure of clarity or obtaining a second measure of clarity may comprise obtaining a gradient magnitude of the result of the first or the second edge detection and obtaining a standard deviation value of this gradient magnitude. Thus, obtaining a first measure of clarity, e.g. a first degree of clarity, may comprise obtaining a first gradient magnitude of the result of the first edge detection, and obtaining a first standard deviation value of the first gradient magnitude. Obtaining a second degree of clarity may comprise obtaining a second gradient magnitude of the result of the second edge detection, and obtaining a second standard deviation value of the first gradient magnitude.

In a method according to embodiments, the at least two depths of the plurality of different focal depths may comprise depths uniformly distributed in a predetermined range.

In a method according to embodiments, the depths uniformly distributed in the predetermined range may comprise a first quartile, a second quartile and a third quartile of the predetermined range.

A method according to embodiments may further comprise determining at least one further depth of the plurality of different focal depths based on the determined focal plane, and repeating the steps of performing the first and second edge detection for this at least one further depth and obtaining the first and second measure of clarity for this at least one further depth. The method may further comprise adjusting the focal plane based on the scalar measure of clarity determined for the at least one further depth.

A method according to embodiments may further comprise determining at least one further depth of the plurality of different focal depths based on the determined focal plane, performing a second-stage edge detection for the at least one further depth based on the amplitude of the reconstructed image, and evaluating a second-stage measure of clarity for the object based on a result of the second-stage edge detection.

In a method according to embodiments, the at least two depths may be uniformly distributed in a first predetermined range of depths, and the at least one further depth may comprise depths uniformly distributed in a second range of depths, in which the second range of depths is narrower than the first predetermined range of depths. The second range of depths may be determined by taking the comparison of the scalar measure of clarity for the at least two depths into account.

Embodiments may thus provide an autofocus method of determining an optimized focal plane that comprises reconstructing a holographic image, identifying objects in the reconstructed image, performing a first-stage edge detection for an object at a set of predetermined depths in a first range based on the real part of the reconstructed image, performing a first-stage edge detection for the object at the set of predetermined depths in the first range based on the imaginary part of the reconstructed image, evaluating a first-stage degree of clarity for the object at the set of predetermined depths based on the standard deviation each of the gradient magnitude of the real part and the imaginary part of an edge of the object detected by the first-stage edge detection, and identifying within the first range a second range associated with the optimized focal plane based on the first-stage degree of clarity.

In example embodiments, the set of predetermined depths may include a number of depths uniformly distributed in the first range. In some embodiments, the set of predetermined depths may include a first quartile, a second quartile and a third quartile of the first range.

In some embodiments, the method may further comprise performing a second-stage edge detection for the object in the second range based on amplitude of the reconstructed image, and evaluating a second-stage degree of clarity for the object based on a result of the second-stage edge detection.

In a method according to embodiments, evaluating the first-stage degree of clarity may comprise obtaining a first gradient magnitude of the result of the first-stage edge detection at each of the predetermined depths associated with the real part, and obtaining a first standard deviation value of the first gradient magnitude.

In a method according to embodiments, evaluating the first-stage degree of clarity may comprise obtaining a second gradient magnitude of the result of the first-stage edge detection at each of the predetermined depths associated with the imaginary part, and obtaining a second standard deviation value of the second gradient magnitude.

In a method according to embodiments, the method may further comprise determining a degree of clarity for the object at each of the predetermined depths based on the first standard deviation value and the second standard deviation value.

In a method according to embodiments, performing the first edge detection may comprise convolving, e.g. convoluting or applying a discrete mathematical convolution operation, the real component, or a part thereof, such as a part corresponding to an identified object, with a Laplacian mask.

In a method according to embodiments, performing the second edge detection may comprise convolving, e.g. convoluting or applying a discrete mathematical convolution operation, the imaginary component, or a part thereof, with a Laplacian mask.

In a second aspect, the present disclosure relates to a computing device for use in an autofocus system for determining a focal plane, the computing device being programmed for executing a method according to embodiments of the first aspect. The computing device may comprise a memory, one or more processors, and one or more programs stored in the memory and configured for execution by the one or more processors.

Embodiments of the present disclosure may provide a computing device, e.g. in an autofocus system, for determining an optimized focal plane. The computing device may comprise a memory, one or more processors, and one or more programs stored in the memory and configured for execution by the one or more processors. The one or more programs may include instructions for reconstructing a holographic image, identifying objects in the reconstructed image, performing a first edge detection for an object at a depth based on the real part of the reconstructed image, performing a second edge detection for the object at the depth based on the imaginary part of the reconstructed image, obtaining a first degree of clarity for the object at the depth based on a first standard deviation with respect to the first edge detection, and obtaining a second degree of clarity for the object at the depth based on a second standard deviation with respect to the second edge detection.

Embodiments of the present disclosure may provide a computing device, e.g. in an autofocus system, for determining an optimized focal plane. The computing device may comprise a memory, one or more processors, and one or more programs stored in the memory and configured for execution by the one or more processors. The one or more programs may include instructions for reconstructing a holographic image, identifying objects in the reconstructed image, performing a first-stage edge detection for an object at a set of predetermined depths in a first range based on the real part of the reconstructed image, performing a first-stage edge detection for the object at the set of predetermined depths in the first range based on the imaginary part of the reconstructed image, evaluating a first-stage degree of clarity for the object at the set of predetermined depths based on the standard deviation each of the real part and the imaginary part of an edge of the object detected by the first-stage edge detection, and identifying within the first range a second range associated with the optimized focal plane based on the first-stage degree of clarity.

Embodiments may also relate to an autofocus system comprising a light source for radiating light towards a sample under test and an imager for acquiring a hologram of the sample. Such autofocus system may further comprise a computing device according to embodiments for determining a focal plane.

In a third aspect, the present disclosure also relates to a computer program product for, when executed on a computing device in accordance with embodiments of the second aspect, performing a method according to embodiments of the first aspect.

Particular aspects are set out in the accompanying independent and dependent claims. Features from the dependent claims may be combined with features of the independent claims and with features of other dependent claims as appropriate and not merely as explicitly set out in the claims.

These and other aspects will be apparent from and elucidated with reference to the embodiment(s) described hereinafter.

Figure 1:
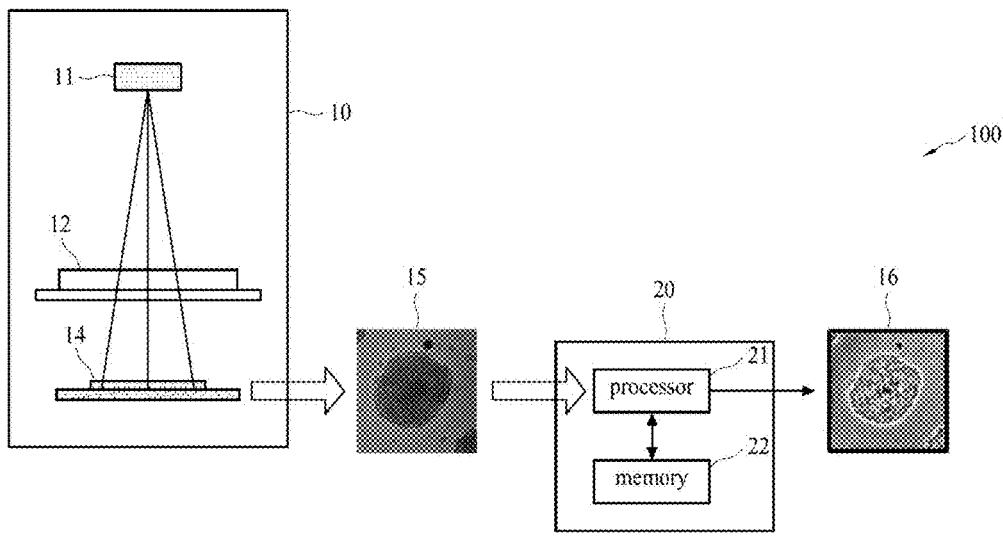
FIG. 1 shows a schematic diagram of an autofocus system, according to example embodiments.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

In a first aspect, relates to an autofocus method, e.g. a computer-implemented autofocus method, for determining a focal plane, e.g. an optimized focal plane, for at least one object, e.g. in a reconstructed holographic image. The method comprises reconstructing a holographic image of the at least one object such as to provide a reconstructed image at a plurality of different focal depths.

The method further comprises performing a first edge detection on the real component for at least two depths of the plurality of different focal depths, e.g. performing this first edge detection separately on each of the at least two depths, and performing a second edge detection on the imaginary component for the at least two depths, e.g. performing this first edge detection separately on each of the at least two depths.

The method further comprises obtaining a first measure of clarity for each of the at least two depths based on a first measure of statistical dispersion with respect to the first edge detection and a second measure of clarity for each of the at least two depths based on a second measure of statistical dispersion with respect to the second edge detection. The first measure of statistical dispersion and the second measure of statistical dispersion may correspond to the same mathematical operation being applied to respectively the result of the first edge detection and the result of the second edge detection. In a method according to embodiments, the first measure of statistical dispersion or the second measure of statistical dispersion may be a standard deviation.

The method further comprises determining the focal plane, e.g. the optimized focal plane, for the at least one object based on a comparison of a scalar measure of clarity for the at least two depths, e.g. comparing the value of the scalar measure of clarity between the at least two depths.

This scalar measure is based on the first measure of clarity and the second measure of clarity.

The method may further comprise identifying an object in the reconstructed image, e.g. identifying objects in the reconstructed image. Such step of identifying may comprise digitizing the reconstructed image, identifying connected regions having a same digitized value; and segmenting each of the connected regions, e.g. to form the local region of the reconstructed image for each of the identified objects.

In a method according to example embodiments, obtaining a first measure of clarity or obtaining a second measure of clarity may comprise obtaining a gradient magnitude of the result of the first or the second edge detection and obtaining a standard deviation value of this gradient magnitude.

A method according to example embodiments may further comprise determining at least one further depth of the plurality of different focal depths based on the determined focal plane, and repeating the steps of performing the first and second edge detection for this at least one further depth and obtaining the first and second measure of clarity for this at least one further depth. The method may further comprise adjusting the focal plane based on the scalar measure of clarity determined for the at least one further depth.

A method according to example embodiments may further comprise determining at least one further depth of the plurality of different focal depths based on the determined focal plane, performing a second-stage edge detection for the at least one further depth based on the amplitude of the reconstructed image, and evaluating a second-stage measure of clarity for the object based on a result of the second-stage edge detection.

In a method according to example embodiments, the at least two depths may be uniformly distributed in a first predetermined range of depths, and the at least one further depth may comprise depths uniformly distributed in a second range of depths, in which the second range of depths is narrower than the first predetermined range of depths. The second range of depths may be determined by taking the comparison of the scalar measure of clarity for the at least two depths into account.

In some embodiments, the set of predetermined depths may include a number of depths uniformly distributed in the first range. In some embodiments, the set of predetermined depths may include a first quartile, a second quartile and a third quartile of the first range.

In some embodiments, the method may further comprise performing a second-stage edge detection for the object in the second range based on amplitude of the reconstructed image, and evaluating a second-stage degree of clarity for the object based on a result of the second-stage edge detection.

In a method according to example embodiments, evaluating the first-stage degree of clarity may comprise obtaining a first gradient magnitude of the result of the first-stage edge detection at each of the predetermined depths associated with the real part, and obtaining a first standard deviation value of the first gradient magnitude.

In a method according to embodiments, evaluating the first-stage degree of clarity may comprise obtaining a second gradient magnitude of the result of the first-stage edge detection at each of the predetermined depths associated with the imaginary part, and obtaining a second standard deviation value of the second gradient magnitude. In a method according to embodiments, the method may further comprise determining a degree of clarity for the object at each of the predetermined depths based on the first standard deviation value and the second standard deviation value.

Figure 2:
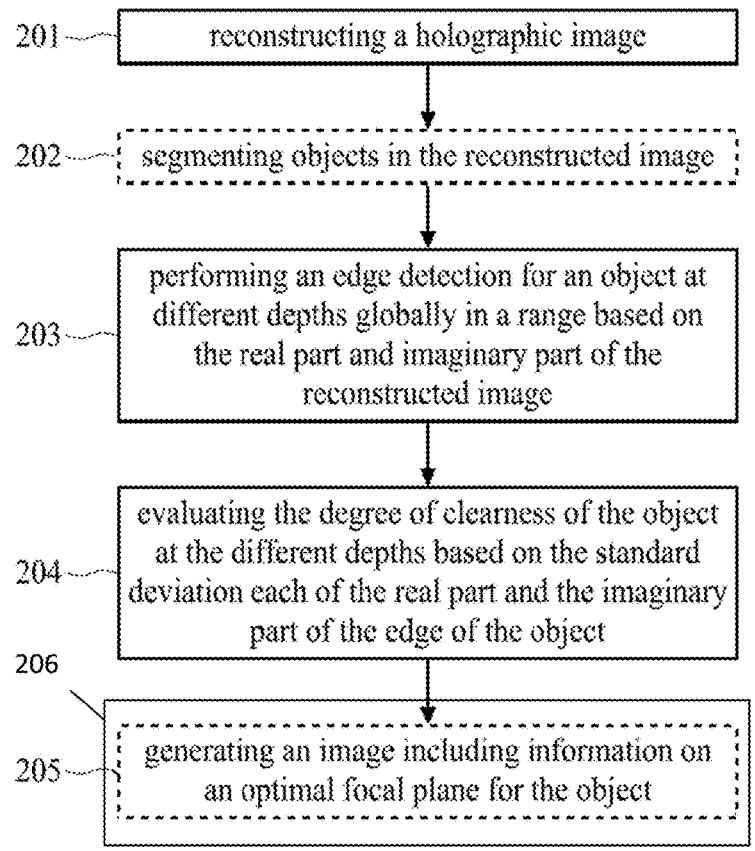
FIG. 2 shows a flow diagram illustrating a method for determining an optimized focal plane, according to example embodiments.

FIG. 2 shows a flow diagram illustrating an autofocus method for determining a focal plane, e.g. for determining a focal depth parameter defining a focal plane, in accordance with example embodiments. A method according to embodiments may be a computer-implemented method, e.g. a method for executing on a processing device, e.g. such as the processing device described hereinbelow in relation to FIG. 1. This focal plane may be an optimized focal plane for an object in a reconstructed holographic image, e.g. a digital holographic image reconstruction algorithm may be applied to reconstruct a holographic image taking this focal plane into account, such that a reconstructed image of high quality is generated. "Optimized" may refer to the focal plane substantially corresponding to a distance of an object of interest to the imaging plane. "Optimized" may refer to a value obtained by algorithmic optimization of a cost measure or a figure of merit, e.g. the scalar measure of clarity referred to hereinbelow, that characterizes at least one property of a reconstructed image indicative of image quality, such as sharpness or clarity. This cost measure or figure of merit may also take, besides clarity or sharpness, other image quality measures into account, such as a contrast, a signal to noise ratio or an entropic or information-theoretic measure. "Optimized" may merely refer to the result obtained by an algorithmic optimization process, and does not necessarily imply a subjective appreciation of the obtained result. It is understood that such algorithmic optimization may be halted at a value sufficiently close to the theoretic optimized value, due to, for example, restrictions on the number of iterations, processing time, or a predetermined tolerance range. Furthermore, such algorithmic optimization may provide a global optimum, but an algorithmic optimization may also, in some embodiments, provide a local optimum, e.g. a local maximum or local minimum of an objective function.

A method according to example embodiments may comprise receiving a holographic image including optical information of a sample, e.g. a sample containing the at least one object. For example, such holographic image may be a raw holographic image, e.g. as directly acquired by an imager, received as input.

A method according to example embodiments comprises a step of reconstructing 201 a holographic image 201 of the at least one object, such as to provide a reconstructed image at a plurality of different focal depths. For example, the reconstructed image may comprise a plurality of two-dimensional reconstructed holographic images, each corresponding to a different focal depth in which the two-dimensional holographic image is reconstructed. The reconstructed image at a plurality of different focal depths may thus form a three-dimensional image or a stack of two-dimensional images for the different focal depths. While reference is made to a depth or a focal depth hereinbelow, reference is made to a distance between a holographic image acquisition plane and a reconstruction plane, also referred to as a focal plane. However, it shall be clear that this is merely a convenient parametrization of the focal plane, and therefore, "depth" or "focal depth" should not be interpreted as limited to such parametrization, and may comprise one or more parameters for defining a surface in space over which the holographic image is reconstructed. For example, depth or focal depth may refer to any combination of parameters defining a plane, or even a non-planar surface, in space in which the holographic reconstruction is performed. Therefore, where reference is made in present description to depth or focal depth, it shall be understood that this may refer to at least one parameter defining a surface, e.g. a plane, in space, in which the holographic reconstruction associated with that depth or focal depth is performed.

The reconstructed image comprises a real component and an imaginary component for jointly encoding phase and amplitude information. For example, the reconstructed image includes phase information and amplitude information, e.g. including a real part and an imaginary part. For example, the reconstructed image may comprise a complex value $c_{kl}=a_{kl}+b_{kl} \cdot i$, in which i represents the imaginary unit $\sqrt{(-1)}$, for each reconstructed image grid location (k,l), which may, in combination, encode both phase information and amplitude information of a wavefront. Thus, the reconstructed image may be a complex-valued image representing both phase and amplitude information of a wavefront in the focal plane. For example, this wavefront may correspond to an object light wave that has formed interference patterns by interaction with a reference light wave, in which these interference patterns were recorded in a raw holographic image that is reconstructed to form the reconstructed holographic image. For example, the reconstructed image may include phase information and amplitude information, e.g. a real part and an imaginary part.

The reconstructed image thus includes phase information and amplitude information. This amplitude and phase information can be represented in the form of a complex field, e.g. an array representative of a complex field, having a real component and an imaginary component. This field may for example be defined over Cartesian coordinates in the image reconstruction plane. However, embodiments are not limited thereto, as it is understood that the use of complex numbers may merely be a mathematically convenient representation. However, such complex number representation may be used in some embodiments, e.g. in the sense that the imaginary component image and the real component image may both contain amplitude-related information and phase-related information, without being redundant, e.g. while both containing at least partially complementary information.

Reconstructing the holographic image may comprise reconstructing a plurality of reconstructed images corresponding to a plurality of focal planes, or reconstructing the holographic image may comprise an iterative algorithm in which at least one reconstructed image is determined at each step for at least one corresponding focal distance, the at least one corresponding focal distance being determined by narrowing down a search range, e.g. in a depth resolution approach progressing from a coarse depth level to a fine depth level.

Referring to FIG. 2, in operation 201, a holographic image including optical information of a sample may be reconstructed, thus providing the reconstructed image. The holographic image may be provided by an imaging system such as imaging system described hereinbelow and illustrated with reference to FIG. 1. Moreover, the sample may include one or more objects at different depths, e.g. in different focal planes. These different depths or different focal planes may be unknown in advance, e.g. may only be known a priori to be comprised in a predetermined, broad range, such as defined by the boundaries of a container or flow channel, and may be determined in accordance with example embodiments.

Digital holography can enable an interference pattern between a reference light beam and an object light beam to be captured, in which this interference pattern contains information about the three-dimensional structure of the imaged volume. Reconstructing 201 the holographic image may be achieved, for example, by angular spectrum methods or convolution methods. Such methods or the like are well-known in the art and are not discussed in detail.

Digital holography enables the reconstruction of both the amplitude and the phase information of a wave front, using reconstruction techniques as known in the art. It is known in the art to reconstruct holographic images, e.g. two-dimensional reconstructed images, at a focal distance provided as parameter to the reconstruction algorithm. Since the raw holographic image may contain detailed object wave front information, e.g. including phase information, a reconstructed image of an object can be determined in any focal plane by appropriately changing the focal distance parameter. Where in conventional microscopy, autofocus can be achieved by mechanically changing the focal distance until a focused image is obtained, a plurality of image planes may be calculated from a single raw holographic image.

Unlike the raw holographic image, which may comprise interference patterns that are not easily interpretable by visual inspection, the reconstructed image may be an image available for direct visual inspection, e.g. may directly represent a physical spatial geometry of the object of interest. However, optimized depths or optimized focal planes of the objects in the reconstructed image may be yet to be determined. Such focal plane of the object or objects of interest may be used to improve the quality of the reconstructed image, e.g. by reiterating the reconstruction, using the same or a different reconstruction algorithm, for example using another reconstruction algorithm that is computationally more demanding, but capable of providing a higher reconstruction quality. The focal plane of the object or objects of interest may also be used to index different focal depths for different image regions, e.g. for different objects, such that a stack of holographic reconstruction images corresponding to different depths can be collapsed into a single two-dimensional image for easy visual inspection or further processing, for example by pattern recognition, machine learning, measurement or other characterization algorithms.

The method further may comprise identifying 202 an object in the reconstructed image, e.g. identifying objects in the reconstructed image. For example, the further step of a first edge detection may be performed for the object, e.g. for each of the identified objects, at a depth based on the real part of the reconstructed image. The second edge detection may be performed for the object, e.g. for each of the identified objects, at the depth based on the imaginary part of the reconstructed image.

Thus, the steps of performing the first and second edge detection, obtaining the first and second measure of clarity and determining the focal plane may be applied to a local region of the reconstructed image corresponding to the or each at least one identified object. In such identifying operation 202, an object or objects in the reconstructed image may be recognized and segmented from each other. Object segmentation may facilitate a detection of an optimized focal plane for each of the objects or an object of interest, e.g. a separate detection of a focal plane optimized for each corresponding object. Example details of identifying 202 the object in the reconstructed image, e.g. of object segmentation, will be discussed further hereinbelow with reference to FIG. 4.

Thus, a single raw holographic image may be obtained, from which a plurality of objects are detected. For each of the detected objects, a focal plane may be determined in accordance with example embodiments. This information may for example be used to stitch image regions together corresponding to the plurality of objects, each image region being reconstructed at the corresponding focal plane. In this manner, a synthetic image may be created that contains each of the plurality of objects in focus.

The method further comprises performing 203 a first edge detection on the real component for at least two depths of the plurality of different focal depths, e.g. performing this first edge detection separately on each of the at least two depths, and performing a second edge detection on the imaginary component for the at least two depths, e.g. performing this first edge detection separately on each of the at least two depths. Edge detection may refer to an image processing method for identifying points in a digital image at which the image brightness changes sharply or has discontinuities. Edge detection does not need to imply determining image locations which form such edge other than making such edge information available in the form of an edge image. Thus, the method may comprise detecting an edge or boundary of the object. This detecting of the edge or boundary comprises performing a first edge detection on the real part of the reconstructed image, e.g. for detecting an edge of the object at a depth, and performing a second edge detection on the imaginary part of the reconstructed image, e.g. for detecting an edge of the object at the depth.

The detection 203 of an edge or boundary of the object, e.g. of any of the identified objects, e.g. of each of the identified objects, may comprise a global search for focal planes at different depths in a predetermined range, e.g. between a first depth $Z_a$ and a second depth $Z_b$. Thus, the at least two depths may comprise a plurality of depths in this predetermined range, e.g. spaced uniformly in this range. The plurality of depths may be considered as possible candidate depths for defining the focal plane, e.g. the optimized focal plane, for the corresponding object.

In some embodiments, the detection 203 of an edge or boundary may start at a depth Z in the predetermined range, e.g. a depth $Z_j$ between $Z_a$ and $Z_b$. The start depth $Z_j$ may for example be determined by a user, e.g. by visual inspection of the reconstructed image. Subsequently, after the edge detection at the depth $Z_j$ is done, the global search may be conducted stepwise for edge detection at a next depth away from the start depth $Z_j$ by a regular interval. For example, a start depth may be 10000 micrometers (μm), e.g. a distance of 10000 μm from the imager, while the next depth is 10100 um or 9900 μm, an interval of 100 μm from the start depth.

In some embodiments, a Laplacian mask may be used in a convolution operation to facilitate the edge detection, e.g. $edge_{image}=conv(image, edge_{operator})$, or, alternatively formulated, $edge_{image}=image*edge_{operator}$, where * refers to the convolution operator, e.g. a discrete image convolution operation. In these formulae, "image" represents a matrix of a reconstructed image at a given depth, and "$edge_{operator}$" serves as a mask or operator for the convolution operation.

However, embodiments are not limited to such a Laplacian mask, and such convolution operations may equally relate to a different edge detection filter, for example a filter for computing the magnitude of the Sobel gradient, of a Sobel-Tenengrad gradient, or a higher-order derivative filter for generating a scalar edge image or a scalar edge-enhanced image. After convolution, a resultant matrix, "$edge_{image}$", which represents the edge of the object, may be obtained.

In accordance with some embodiments, the edge of the object with respect to the real part and imaginary part of the reconstructed image may be denoted as "$edge_{image,real}$" and "$edge_{image,imaginary}$", respectively, and may be determined as follows:

$$edge_{image,real}=conv(real\_image, edge_{operator}), \text{ and}$$

$$edge_{image,imaginary}=conv(imaginary\_image, edge_{operator}),$$

where $edge_{operator}$ represents an edge detection filter, such as a gradient magnitude filter or a Laplacian filter, or another suitable edge detection convolution filter as known in the art.

In a method according to example embodiments, performing the first edge detection on the real component may thus comprise applying a first edge detection filter for detecting edges, and performing the second edge detection on the imaginary component may comprise applying a second edge detection filter for detecting edges.

The method further comprises obtaining 204 a first measure of clarity for each of the at least two depths based on a first measure of statistical dispersion with respect to the first edge detection and a second measure of clarity for each of the at least two depths based on a second measure of statistical dispersion with respect to the second edge detection. The first measure of statistical dispersion and the second measure of statistical dispersion may correspond to the same mathematical operation being applied to respectively the result of the first edge detection and the result of the second edge detection. The method according to example embodiments further comprises a next step of determining 204 a degree of clarity of the edge or boundary of the object at each of the different depths is determined. This determining 204 comprises obtaining a first measure of clarity, e.g. a degree of clarity, for the object at the depth based on a first standard deviation with respect to the first edge detection and obtaining a second measure of clarity, e.g. a degree of clarity, for the object at the depth based on a second standard deviation with respect to the second edge detection.

In some embodiments, the measure of clarity, e.g. the degree of clarity, denoted as $edge_{clarity}$, may be determined based on a statistic result of the edge detection in operation 203, for example:

$$edge_{clarity}=std(gradientmagnitude(edge_{image})), \text{ or}$$
alternatively formulated, $$edge_{clarity}=std(|gradient(edge_{image})|), \text{ or in another}$$
alternative formulation, $$edge_{clarity}=\text{standard\_deviation of}$$

$$\sqrt{(conv(edge_{image}, gradient_{operator,x}))^2 + (conv(edge_{image}, gradient_{operator,y}))^2},$$

where $edge_{image}$ is the resultant matrix obtained in operation 203, gradient(M) represents the gradient of M (in the present embodiment, M being the resultant matrix edgeimage), gradientmagnitude(M) represents a magnitude of the gradient of M, such as an Euclidean norm, and std(N) represents the standard deviation of N (in the present embodiment, N being the gradient of edgeimage).

As defined by the equations hereinabove, $edge_{clarity}$, which is a scalar real numeric value, for the edge of the object at each of the different depths can be obtained. Moreover, in accordance with example embodiments, the degree of clarity with respect to the real part and imaginary part of the edge of the object in the reconstructed image may be determined separately, and denoted as edge$_{clarity,real}$ and edge$_{clarity,imaginary}$, respectively. These values may be determined by the equation hereinabove as follows:

edge$_{clarity,real}$=std(|conv(edge$_{image,real}$, gradient$_{operation}$)|), and edge$_{clarity,imaginary}$=std(|conv(edge$_{image,imaginary}$, gradient$_{operation}$)|).

The method further comprises determining the focal plane, e.g. the optimized focal plane, for the at least one object based on a comparison of a scalar measure of clarity for the at least two depths, e.g. comparing the value of the scalar measure of clarity between the at least two depths. This scalar measure is based on the first measure of clarity and the second measure of clarity.

This determining of the focal plane may comprise outputting at least one value representative of the focal plane. For example, determining the focal plane may comprise generating 205 an image including information on an optimized focal plane for the or for each object.

A focal plane, e.g. a focal distance, obtained in accordance with example embodiments, may provide a good focus of the image, and hence a clear or sharp edge of the object in the image. Such clear or sharp edges may be characterized by large gradient values, e.g. larger than in a similar out-of-focus reconstruction, and a large degree of clarity.

To determine an optimized focal plane for the object, in accordance with some embodiments, a scalar measure of clarity, e.g. a metric EC, may be evaluated as follows:

$$EC = \sqrt{(edge_{clarity,\,real})^2 + (edge_{clarity,\,imaginary})^2}.$$

However, such scalar measure may also comprise another scalar summary operation applied to the first measure of clarity and the second measure of clarity, such as a sum of absolute values, a sum of squares, a maximum of absolute values, or, in general, any function suitable as a metric norm in the mathematical sense, or even a semi-norm.

Thus, a scalar measure of clarity of the object at each of the different depths may be calculated, e.g. based on the standard deviation of the real part of the edge image and the standard deviation of the imaginary part of the edge image of the object at each depth, as described hereinabove.

By comparing the values of the scalar measure of clarity, e.g. the metric EC, at the different depths, a depth having a maximal EC value may be identified as an optimized depth or optimized focal plane for the object in the predetermined range between $Z_a$ and $Z_b$. Subsequently, an image including information on the optimized focal plane for the object may be generated 205.

Figure 20:
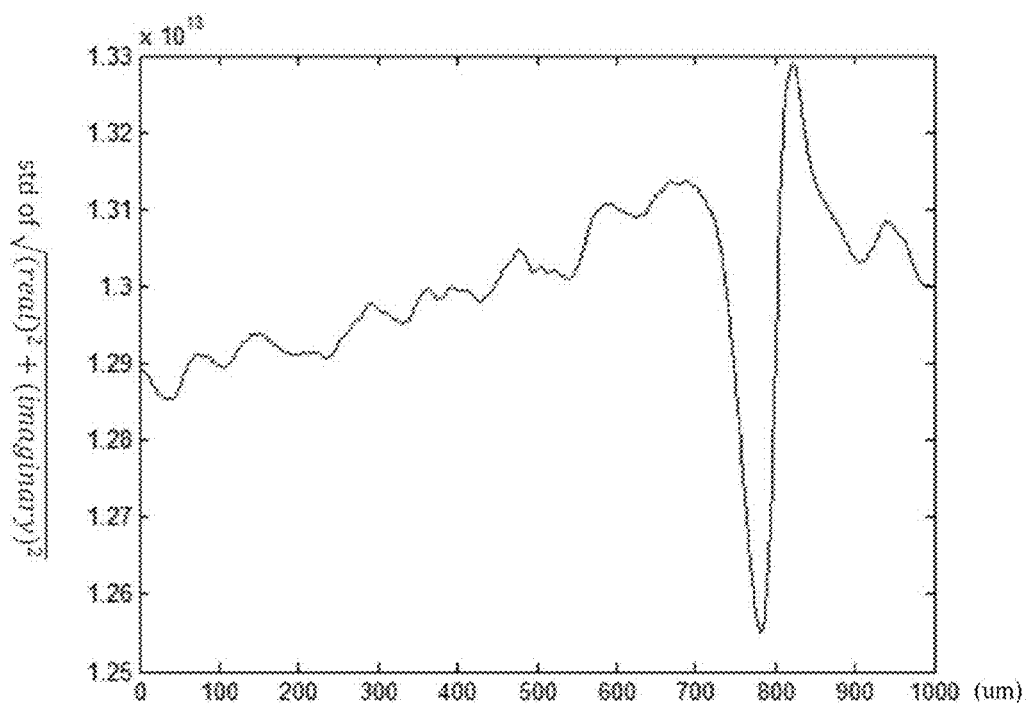
FIG. 20 illustrates a degree of clarity as a function of different focal depths, according to example embodiments.
Figure 21:
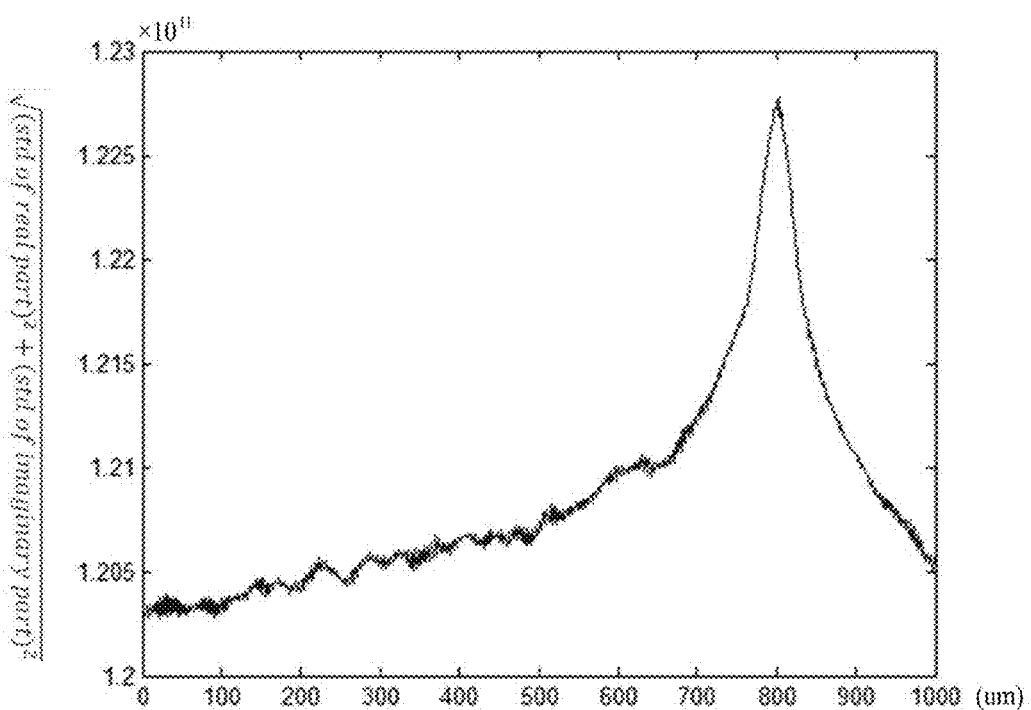
FIG. 21 shows a degree of clarity, as may be obtained by example embodiments, as a function of different focal depths, according to example embodiments.

FIG. 20 and FIG. 21 show diagrams illustrating a degree of clarity at different depths. Referring to FIG. 20, a measure of clarity as may be known in the art is illustrated. The y-axis represents the degree of clarity determined by taking the standard deviation (std) of an amplitude image, which may be briefly expressed as applying a statistic summary operation, e.g. computing a standard deviation, on an edge detection image obtained after reducing the complex number values of the holographic image to the corresponding complex modulus values, e.g. as can be summarized by an operation template std($\sqrt{((\text{real part})^2+(\text{imaginary part})^2)}$) for indicating the order of performed operations.

Referring to FIG. 21, the y-axis represents a measure of clarity determined in accordance with some embodiments, e.g. the measure EC as defined hereinabove, which can be briefly expressed as reducing a complex valued clarity measure to its complex modulus, the real and imaginary components of the complex valued clarity measure being computed by a statistical summary operation, e.g. a standard deviation, derived from an complex valued edge image, e.g. as can be summarized by an operation template $\sqrt{((\text{std of real part})^2+(\text{std of imaginary part})^2)}$ for indicating the order of performed operations.

Surprisingly, it can be observed that the curve in FIG. 21 is more regular than the curve shown in FIG. 20, e.g. shows less pronounced local extrema. Such regular curve, e.g. a smoother curve, facilitates determining a "hot zone" where an optimized focal plane may exist, as will be discussed in detail with reference to FIG. 9 to FIG. 19. As a result, the search process may be simplified and hence the search time is reduced. For example, the risk of the optimization process being trapped in a local maximum, e.g. corresponding to a sub-optimized focal plane, is reduced. Furthermore, a smoother optimization criterion function may enable the use of more efficient search algorithms, such as, for example, optimization methods which are at least partially based on a gradient of the optimization function with respect to the optimization parameter, e.g. a derivative with respect to a focal depth or at least one parameter defining the focal plane to be determined.

Figure 3:
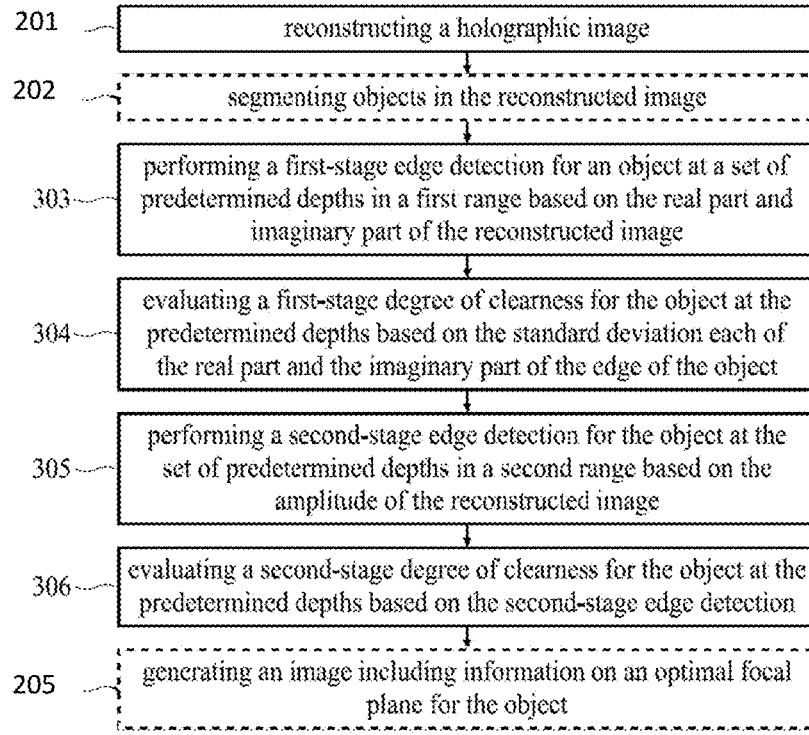
FIG. 3 shows a flow diagram that illustrates a method of determining an optimized focal plane for an object, according to example embodiments.

FIG. 3 shows a flow diagram illustrating another example method of determining an optimized focal plane for an object, in accordance with some embodiments. While the example method illustrated in FIG. 2 may provide a global search, the method in FIG. 3 may accelerate the search process by evaluating a predetermined set of depths, fewer than those used for a global search. Moreover, according to a method such as illustrated in FIG. 3, in accordance with example embodiments, a coarse search and a fine search may be conducted for determining a focal plane, e.g. an optimized focal plane.

Referring to FIG. 3, after reconstructing 201 a holographic image and, optionally, identifying 202 an object in the reconstructed image, e.g. segmenting objects in the holographic image, in operation 303, a first-stage edge detection for the object at a set of predetermined depths, e.g. in a first predetermined range between $Z_a$ and $Z_b$, may be performed, in which this edge detection is based on the real part and imaginary part of the reconstructed image. This first-stage edge detection may include a first edge detection with respect to the real part and a second edge detection with respect to the imaginary part, resulting in edge$_{image,real}$ and edge$_{image,imaginary}$, respectively, e.g. in accordance with an equation provided hereinabove.

In some embodiments, the set of predetermined depths in the first range may include three depths uniformly distributed between $Z_a$ and $Z_b$, which will be further discussed with reference to FIG. 9 to FIG. 19. However, the number of sampled depths, e.g. the predetermined depths, need not be limited to three points.

The method in accordance with example embodiments may further comprise evaluating 304 a first-stage measure of clarity for the object at each of the predetermined depths. The first-stage degree-of-clarity evaluation may comprise determining edge$_{clarity,real}$ and edge$_{clarity,imaginary}$ by e.g. applying edge$_{image,real}$ and edge$_{image,imaginary}$ in the corresponding equation provided hereinabove, and then determining a first metric EC1 by computing a scalar norm of the components edge$_{clarity,real}$ and edge$_{clarity,imaginary}$. As a result, the degree of clarity of the object at each of the predetermined depths is calculated based on the standard deviation of the real part and the standard deviation of the imaginary part of the edge of the object at each predetermined depth.

Based on the values of the first metrics EC1 at the predetermined depths, for example, three uniformly distributed depths in the first range, an EC1 curve may be constructed by connecting these EC1 positions. Such EC1 curve includes information on a regular curve as illustrated in FIG. 21. Moreover, the inclination of an EC1 curve over the first range may reveal information on the global peak, e.g. corresponding to an optimized focal plane, of the regular curve. For example, if the EC1 curve tends to go up, the optimized focal plane can be expected to fall in the higher part of the first range. Furthermore, if the EC1 curve tends to go down, the optimized focal plane can be expected to fall in the lower part of the first range. By using the inclination, a second range between $Z_a'$ and $Z_b'$, which is smaller than and falls within the first range, can be determined.

Subsequently, a second-stage edge detection 305 for the object at different depths in the second range may be performed. In some embodiments, the amplitude of the reconstructed image may be used in the second-stage edge detection, as expressed by $edge_{image,amplitude}$=conv(amplitude_image, $edge_{operator}$), where amplitude_image represents a matrix of the amplitude image of the reconstructed image at a given depth. This amplitude image may correspond to the complex modulus of the complex components real_image and imaginary_image of the reconstructed image.

In some embodiments, the second-stage edge detection may be performed at different depths globally in the second range. In some embodiments, the second-stage edge detection may be performed at a set of depths that are fewer than those used for the global search in the second range.

The method in accordance with embodiments may further comprise determining 306 a second-stage degree of clarity for the object based on the result of the second-stage edge detection is performed. The second-stage degree of clarity evaluation may comprise determining a second metric EC2 by applying $edge_{image,amplitude}$ into the following equation:

$$EC2 = \text{standard\_deviation of}$$
$$\sqrt{(conv(edge_{image,amplitude}, gradient_{operator,x}))^2 + (conv(edge_{image,amplitude}, gradient_{operator,y}))^2}$$

By comparing the values of EC2 associated with the different depths in the second range, a depth having a maximal EC2 value can be identified as an optimized depth or optimized focal plane for the object in the second range between $Z_a'$ and $Z_b'$. Subsequently, in operation 205, an image including information on the optimized focal plane for the object is generated.

It shall be clear that such procedure can be implemented in a three-stage process, a four-stage process, or, generally, any number of stages, in which the obtained optimized focal plane of a previous stage is used to define, at least in part, the search range of depths in the next stage. It is also understood, that the step of reconstructing the holographic image may be performed in-line, e.g. only reconstructing a particular focal plane when the corresponding depth is used in one of the stages.

In embodiments such as illustrated by FIG. 3, operations 303 and 304, performed under a wider range, e.g. the first range between $Z_a$ and $Z_b$, may constitute a coarse search of the method, while operations 305 and 306, performed under a narrower range, e.g. the second range between $Z_a'$ and $Z_b'$, may constitute a fine search of the method for an optimized focal plane for the object. Although one coarse search stage and one fine search stage are discussed in the embodiments, more than one coarse search stages and more than one fine search stages also fall within the scope of the present disclosure. Some embodiments enable the searching process to be performed efficiently and at a low computational cost, e.g. a low processing time can be achieved.

However, in accordance with some embodiments, it shall be clear that construction of a visually interpretable curve is not essential, as described hereinabove. Furthermore, other numerical optimization methods as known in the art may be applied to reduce the search range appropriately.

For example, the predetermined range of depths, e.g. in the first stage, may comprise two boundary points, e.g. $Z_a$ and $Z_b$, and at least two interior points, e.g. comprised in the range $]Z_a,Z_b[$. The boundary point which lies closest to the interior point that has the lowest EC1 value may then be rejected, and the method may proceed to the next step with the reduced depth search range formed by the non-rejected boundary point and the interior point having the lowest EC1 value. A direct search algorithm may only calculate, in subsequent steps, one additional internal point. Furthermore, alternative ways of dividing the search interval may be applied, as known in the art, for example, by applying a golden section search.

Furthermore, other search methods as known in the art may be applied, such as gradient descent, Newton's method, a Quasi-Newton method. Other line search methods are also known in the art, which may also be applied without inventive effort. Alternatively, a trust region search approach may be applied. Embodiments are also not limited to a line-search, but may, for example, comprise a grid search or other vector parameter optimization, since "depth" in the context of present disclosure may encompass a vector-valued parameter, e.g. defining not only a distance to the imaging plane, but also an inclination with respect to that imaging plane.

In a method according to example embodiments, a search method may be iteratively applied until a depth, or other relevant optimization parameter or parameters defining the focal plane, is reached that is sufficiently close to the maximum of the objective function, e.g. EC1 or EC2. "Sufficiently close" may correspond for example to a predetermined tolerance range on the depth, a predetermined tolerance range on the objective function value, a predetermined number of iterations, a figure of merit, another stopping criterion for numerical optimization as known in the art, or a combination of any of the aforementioned. However, as discussed hereinabove, such search method may be applied in a first stage, e.g. at a coarse level, to iteratively narrow down a search range, which may be further reduced in a second stage, e.g. at a fine level as discussed hereinabove. For example, the second stage may perform a global search in a range as narrowed down by the first stage. Furthermore, the second stage may use an objective function as determined by the complex modulus of a complex number having real and imaginary components corresponding to summary statistics respectively applied to edge images obtained from the real and imaginary holographic reconstruction images, e.g. EC1 as described hereinabove. However, the second stage may also use an objective function as determined by a summary statistic applied to edge images obtained from the complex modulus holographic reconstruction image, e.g. an amplitude image, such as the example scalar measure EC2 described hereinabove.

Figure 4:
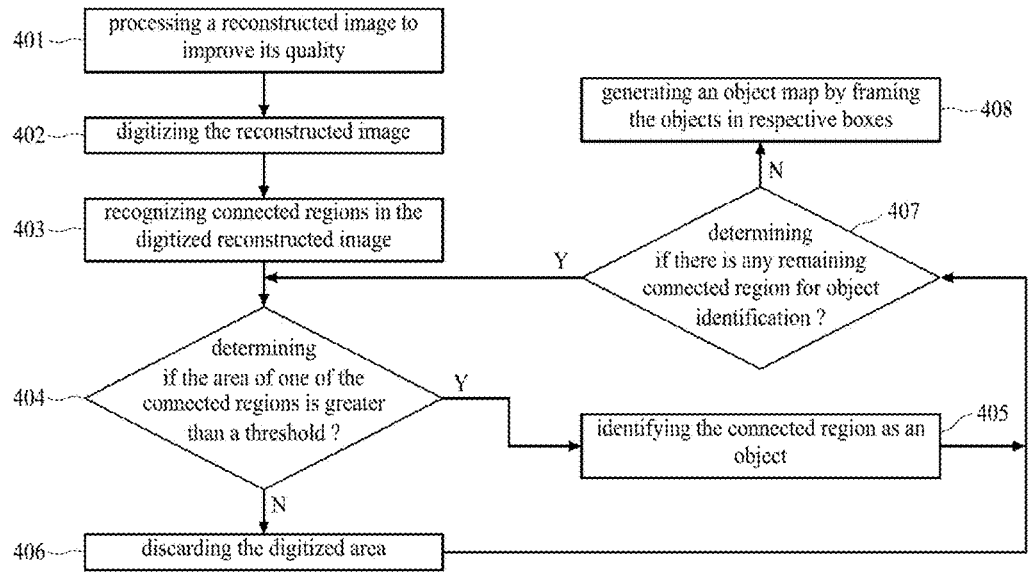
FIG. 4 shows a flow diagram that illustrates a method of object segmentation, according to example embodiments.

FIG. 4 shows a flow diagram illustrating a method for identifying an object in the reconstructed image, e.g. an object segmentation method, according to example embodiments. Such method for identifying an object, or another method for identifying an object as known in the art, may be applied in some embodiments on each reconstructed 2D image corresponding to each reconstructed depth independently, e.g. the object may be identified in each two-dimensional image of a stack of reconstructed images formed by a plurality of reconstruction depths.

This method for identifying an object in the reconstructed image may comprise pre-processing 401 a reconstructed image to improve its quality. For example, filtering may be performed to reduce noise in the resulting image, e.g. in some embodiments according, only filtering may be applied, or a filtering operation may be applied in combination with other noise reduction techniques. Adaptive morphological filtering may be performed to enhance image sharpness or contrast of the resulting image. Moreover, both minimum filtering and adaptive morphological filtering may both be applied in an embodiment. Nevertheless, the image pre-processing 401 may be considered optional.

In a next operation, the reconstructed image 402 may be digitized by, for example, assigning an adaptive value to each pixel, resulting in a digitized reconstructed image. Here, "digitized" may refer particularly to a binary quantization of the reconstructed image pixel values. For example, a binary value "1" may be assigned to a pixel if the grayscale of the pixel is greater than, or greater than or equal to, a threshold value, and the other binary value "0" may be assigned to a pixel if the grayscale of the pixel falls below the threshold. As a result, a binary image of the reconstructed image may be obtained. The threshold may for example be determined taking the intensity of the image into account, e.g. by applying a image intensity normalization.

The method further may comprise recognizing 403 connected or continuous regions, e.g. regions labeled binary "1" in the digitized reconstructed image. Each of the connected regions may be grouped and numbered. For example, the pixels in each connected region may be grouped to form a group identified by a unique identifying number. Each group may be considered to be a potential object. For example, a plurality of connected regions may be grouped together based on a proximity measure or a morphological criterion, e.g. such as to attribute multiple connected regions to the same object if they are in close proximity or only separated by small volume that is below the binary quantification threshold referred to in step 402, e.g. small volume labeled "0" in the digitized reconstructed image. Alternatively, each connected region may be identified as a corresponding group, e.g. without collecting multiple regions into a single group if required, for example if the image contrast is sufficient to allow a high fidelity digitization of the reconstruction image.

The method may further comprise identifying 405 a group as an object if this group of connected regions, for example group #1, has a size greater than or equal to a threshold. However, if a group of connected regions, for example group #2, has a size smaller than the threshold, this group may be considered to be an impurity or a noise artefact and may be discarded 406.

The method may further comprise determining 407 whether there is a remaining group for object detection, e.g. to be identified 405 or discarded 406. If affirmative, operations 404 to 406 are repeated. If not, meaning all potential objects were identified or discarded, an object map may be generated 408.

Figure 5:
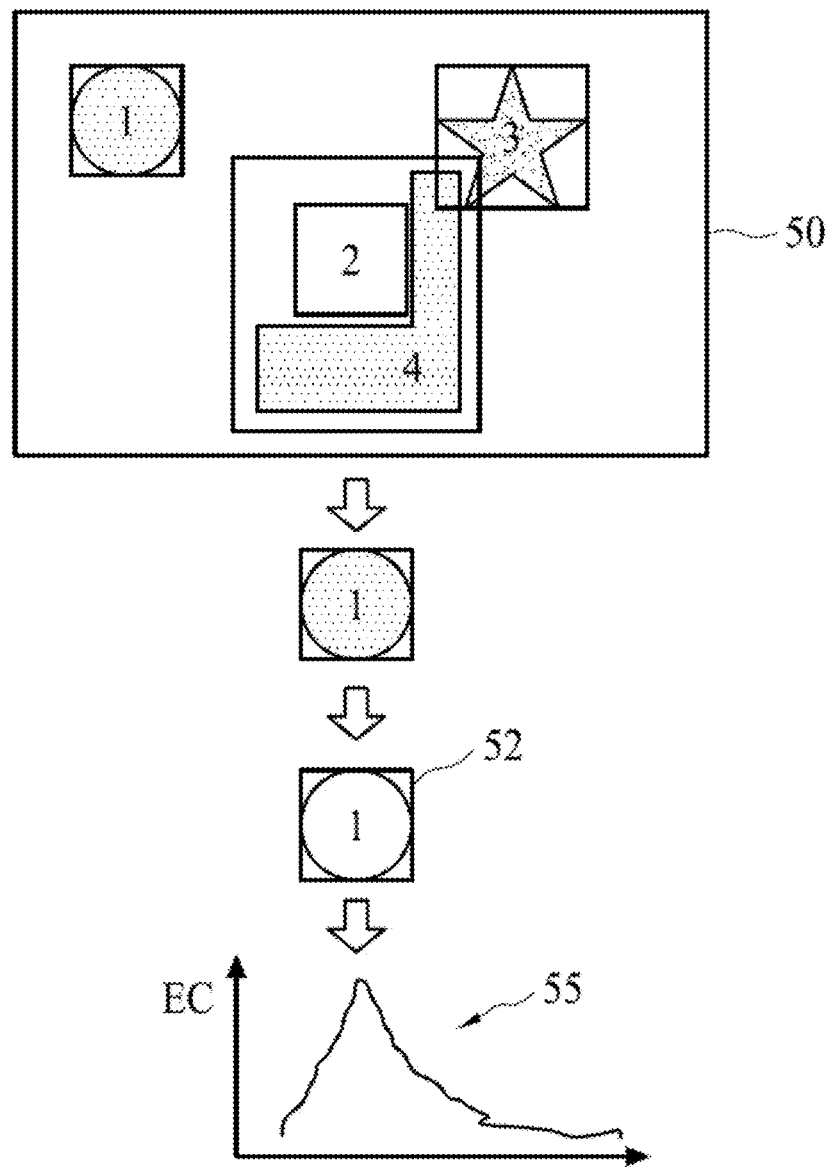
FIG. 5 illustrates a method of edge detection and edge clarity evaluation, according to example embodiments.

An example object map 50 is shown in FIG. 5. Referring to FIG. 5, there are four objects numbered 1 to 4 in object map 50. Each of objects 1 to 4 may be framed by a rectangular box, e.g. a minimum bounding box or a bounding box having a predetermined margin around the minimum bounding box. Such rectangular box may snugly fit a corresponding object, as in the cases of objects 1 to 3, or frame a corresponding object with a margin, as in the case of object 4. Moreover, one box may overlap another box, as in the cases of objects 3 and 4, or entirely surround another box, as in the cases of objects 4 and 2. Furthermore, one box may be spaced apart from another box, as in the cases of objects 1 and 3. These boxes may facilitate subsequent processing of their respective objects. As illustrated in FIG. 5, object 1 may be extracted from object map 50 by, for example, cropping the reconstructed holographic image along its box. Next, the edge or boundary 52 of object 1 may be detected by performing an edge or boundary detection in accordance with example embodiments. Subsequently, the edge 52 may undergo a degree-of-clarity evaluation, e.g. resulting in a metric EC, as described hereinabove.

A sufficient number of metrics EC, e.g. gathered for a plurality of focal depths, can form a detailed EC curve 55 over a search range, as illustrated in FIG. 5. In EC curve 55, the metrics EC may have a bell distribution with respect to the focal depth. Accordingly, a good focal plane can be identified, e.g. an optimized or even the best focal plane. In some existing approaches, based on the amplitude of a reconstructed image in a global search, a curve may also be formed. However, such a curve may have pronounced peaks and valleys, e.g. as illustrated by FIG. 20 and it may thus prove difficult to identify an optimized focal plane, e.g. to determine the global maximum.

Figure 6:
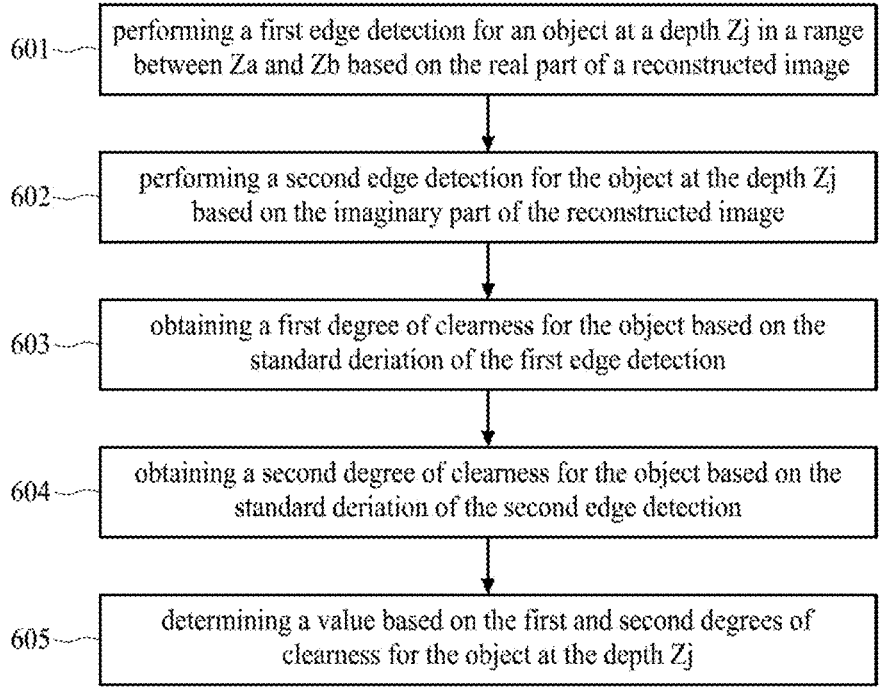
FIG. 6 illustrates a method of determining a degree of clarity for an object, according to example embodiments.

FIG. 6 shows a flow diagram illustrating a method for determining a measure of clarity for an object, e.g. a degree of clarity for an object, in accordance with example embodiments. Referring to FIG. 6, a first edge detection 601 for an object at a depth $Z_j$ in a range between $Z_a$ and $Z_b$ may be performed based on the real part of a reconstructed image. Thus, the edge or boundary $edge_{image,real}$ of the object at the depth $Z_j$, may be determined, e.g. $edge_{image,real}$=conv(real_image, $edge_{operator}$).

Likewise, the method may further comprise performing a second edge detection 602 for the object at the depth $Z_t$ based on the imaginary part of the reconstructed image, resulting in $edge_{image,imaginary}$. Operations 602 and 601, however, may be performed interchangeably in order.

The method may further comprise obtaining a first degree of clarity 603, $edge_{clarity,real}$, for the object based on the standard deviation of the first edge detection. The value of $edge_{clarity,real}$ may be determined by $edge_{clarity,real}$=standard_deviation of $$\sqrt{(conv(edge_{image,real}, gradient_{operator,x}))^2 + (conv(edge_{image,real}, gradient_{operator,y}))^2}.$$

In operation 604, a second degree of clarity, $edge_{clarity,imaginary}$, for the object may be obtained based on the standard deviation of the second edge detection, e.g. in similar manner as in operation 603. Likewise, operations 603 and 604 may be performed interchangeably in order. Furthermore, operations 601, 603, 602, 604 may be executed consecutively, or operations 602, 604, 601, 603 may be executed consecutively.

Next, a metric EC based on the first and second degree of clarity values, $edge_{clarity,real}$ and $edge_{clarity,imaginary}$, may be determined 605, e.g. by $$EC = \sqrt{(edge_{clarity, real})^2 + (edge_{clarity, imaginary})^2},$$

in which $edge_{clarity,real}$=std(|conv($edge_{image, real}$, $gradient_{operation}$)|), and $edge_{clarity,imaginary}$=std(|conv ($edge_{image, imaginary}$, $gradient_{operation}$)|).

Figure 7:
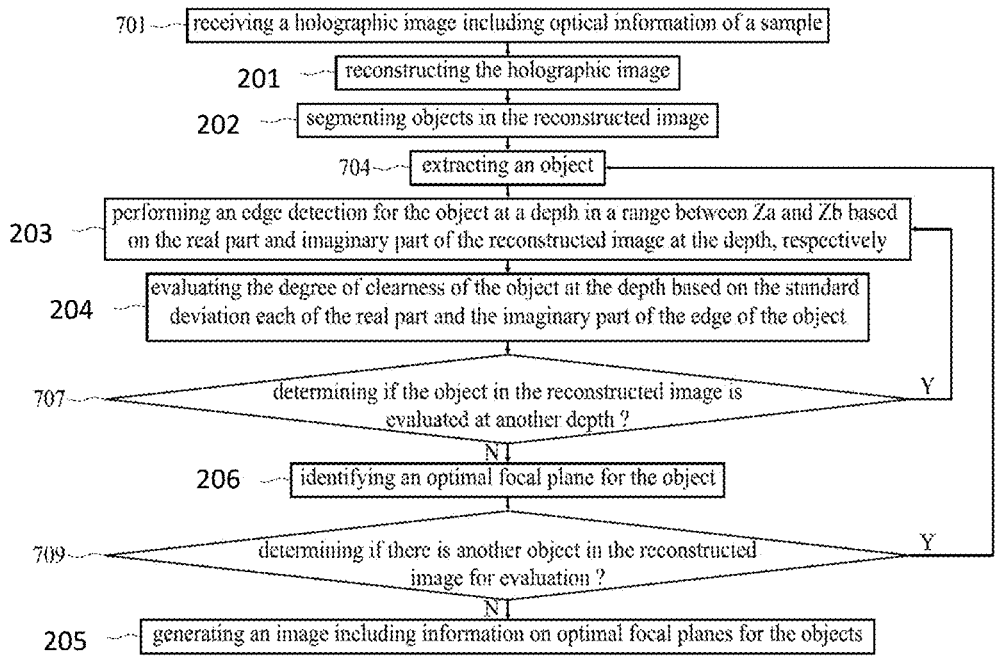
FIG. 7 illustrates a method of determining optimized focal planes for one or more objects, according to example embodiments.

FIG. 7 shows a flow diagram illustrating a method of determining optimized focal planes for one or more objects, in accordance with example embodiments. While the method in FIG. 2 may be applicable for an object under test, the method in FIG. 7 may be applicable for a sample including one or more objects of interest.

Referring to FIG. 7, a holographic image may be received 701, and reconstructed 201. Subsequently, objects in the reconstructed image may be recognized and segmented 202, resulting in an object map. Then, an object of interest may be extracted 704 from the object map.

Furthermore, an edge detection 203 may be performed for the extracted object at a depth in a range based on the real part and imaginary part of the reconstructed image, respectively. The edge detection process may include a first edge detection with respect to the real part and a second edge detection with respect to the imaginary part. Moreover, as previously discussed, the first edge detection and the second edge detection may be performed in parallel or in series. In series, the first edge detection may be performed before or after the second edge detection.

The degree of clarity of the object at the depth may be evaluated 204 based on a standard deviation each of the first and second edge detections.

Then, it may be determined 707 whether the degree of clarity of the object is to be evaluated at another depth. If affirmative, operations 203, 204 and 707 may be repeated. If not, the evaluation of the degree of clarity of the object at different depths in the range is all done. The depth that results in the maximal degree of clarity may be identified 206 as an optimized focal plane for the object in operation.

Next, it is determined 709 if there is another object in the reconstructed image yet to be evaluated. If affirmative, operations 704, 203, 204, 707, 206 and 709 may be repeated. If not, meaning that all of the objects of interest have been evaluated, an image including information on the optimized focal planes for the objects may be generated 205.

Figure 8:
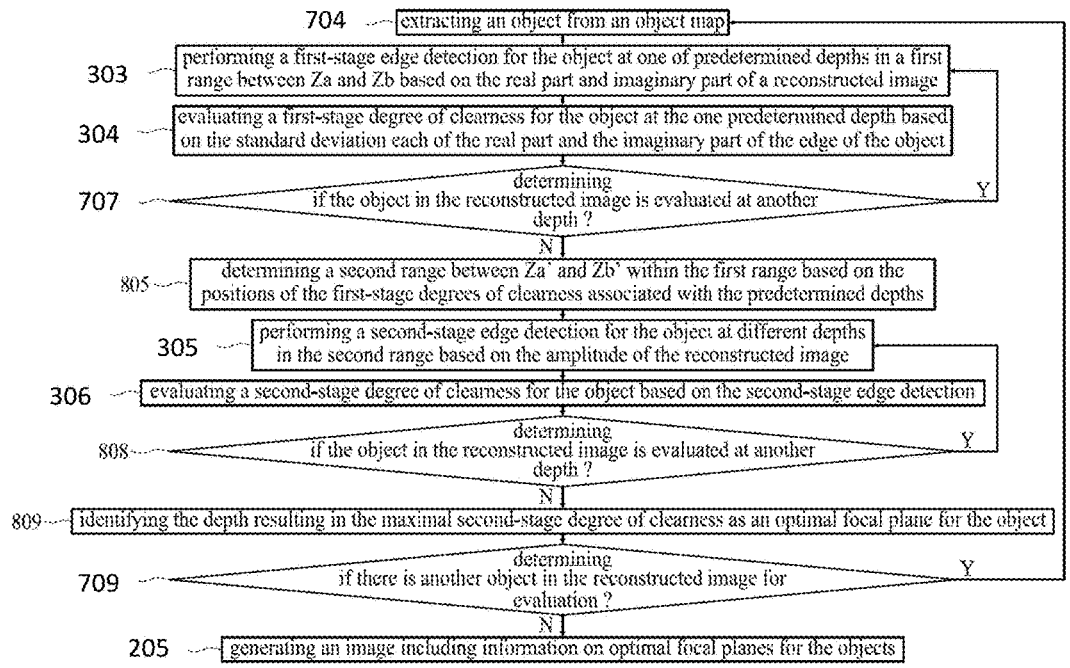
FIG. 8 illustrates a method of determining optimized focal planes for one or more objects, according to example embodiments.

FIG. 8 shows another flow diagram illustrating a method for determining optimized focal planes for one or more objects, in accordance with example embodiments. While a method such as shown in FIG. 3 may be applicable for an object under test, the method in FIG. 8 may be applicable for a sample including one or more objects of interest.

Referring to FIG. 8, an object may be extracted 704 from an object map. Then, a first-stage edge detection 303 for the object at one of predetermined depths in a first range between $Z_a$ and $Z_b$ may be performed based on the real part and the imaginary part of a reconstructed image. The first stage edge detection may include a first edge detection associated with the real part and a second edge detection associated with the imaginary part.

Further, a first-stage degree of clarity for the object at the one predetermined depth may be evaluated 304 based on the standard deviations of respectively the real part and the imaginary part of the edge of the object at the one predetermined depth.

Next, it may be determined 707 if the object in the reconstructed image is to be evaluated at another depth. If affirmative, operations 303, 304 and 707 may be repeated. If not, a second range between $Z_a'$ and $Z_b'$, which falls within the first range, may be determined 805 based on the positions of the first-stage degrees of clarity associated with the predetermined depths.

Then, a second-stage edge detection for the object at different depths in the second range, e.g. based on the amplitude of the reconstructed image, may be performed 305. Then, a second-stage degree of clarity for the object based on the second-stage edge detection may be performed 306.

It may then be determined 808 if the object is to be determined at another depth in the second range. If affirmative, operations 305, 306 and 808 may be repeated. If not, the depth in the second range that results in the maximal second-stage degree of clarity may be identified 809 as an optimized focal plane.

Next, it may be determined 709 if there is another object in the reconstructed image for evaluation. If affirmative, all of the operations described hereinabove in relation to FIG. 8 may be repeated. If not, an image including information on the optimized focal planes for the objects may be generated 205.

FIG. 9 to FIG. 19 are schematic diagrams illustrating a method of determining an optimized focal plane according to example embodiments. Unlike methods using a global search, a method such as illustrated by FIG. 9 to FIG. 19 may use fewer depths to conduct a search for an optimized focal plane. Accordingly, the method accelerates the process of determining an optimized focal plane. The number of depths that are used may not be sufficient to form an EC curve, but, by an appropriate deployment of these depths over a search range, the inclination of the EC curve can be revealed and hence a narrower range where an optimized depth may fall can be anticipated. In accordance with embodiments, N depths may be used to divide a search range into N+1 regions, e.g. each having substantially the same interval, in which N is a natural strictly positive number. In embodiments such as illustrated by FIG. 9 to FIG. 19, three predetermined checkpoints or depths $Z_1$, $Z_2$ and $Z_3$ in a first range $Z_a$ to $Z_b$ may be used.

As discussed hereinabove, by taking the standard deviations of respectively the real part and the imaginary part of the edge of an object and combining these standard deviations into a single scalar value, e.g. in accordance with $$EC = \sqrt{(edge_{clarity,\,real})^2 + (edge_{clarity,\,imaginary})^2}\,,$$

a regular curve as described and illustrated with reference to FIG. 21 can be obtained. The regularity of the curve facilitates narrowing down a search range.

Figures 9, 10:
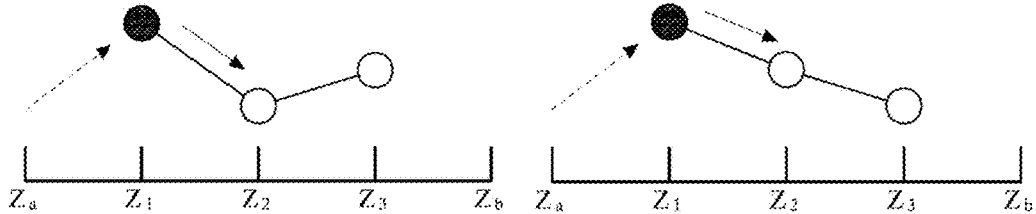
FIG. 9 schematically illustrates a stage of a method for determining an optimized focal place, according to example embodiments.
FIG. 10 schematically illustrates a stage of a method for determining an optimized focal place, according to example embodiments.

Referring to FIG. 9, checkpoints $Z_1$, $Z_2$ and $Z_3$ may be separated by a regular interval, and may be comprised in a range $Z_a$ to $Z_b$. Accordingly, checkpoints $Z_1$, $Z_2$ and $Z_3$ may correspond to the first quartile, second quartile (or median) and third quartile, respectively, of the depths between $Z_a$ and $Z_b$. The first metrics, as defined hereinabove, associated with checkpoints $Z_1$, $Z_2$ and $Z_3$, may be denoted as $EC_{Z1}$, $EC_{Z2}$ and $EC_{Z3}$, respectively. It may be assumed that the first metrics at one side of the best focal plane (e.g. corresponding to the maximal first metric) are strictly increasing while at the other side are strictly decreasing, thus by evaluating the values of the first metrics $EC_{Z1}$, $EC_{Z2}$ and $EC_{Z3}$, within the first range, a second range where the optimized focal plane may lie can be determined. As a result, the search region can be narrowed down from the larger first range to the smaller second range, which facilitates the search for the optimized focal plane.

For illustration, the largest first metric value among the first metrics $EC_{Z1}$, $EC_{Z2}$ and $EC_{Z3}$ is illustrated by a black circle, while the others are illustrated by white circles. Referring to FIG. 9, $EC_{Z1}$ is the greatest first metric in present example, while $EC_{Z2}$ is smaller than $EC_{Z3}$. Since the slope of the line between $Z_1$ and $Z_2$ is larger than that between $Z_2$ and $Z_3$, the curve formed by $Z_1$, $Z_2$ and $Z_3$ is inclined to climb down rather than climb up. A strictly decreasing (shown in a solid arrow) region between $Z_1$ and $Z_2$ may imply a strictly increasing (shown in a dotted arrow) region between $Z_a$ and $Z_1$, given the above assumption. It can thus be determined that an optimized focal plane, e.g. located proximal to the best focal plane, falls within a second range between $Z_a$ and $Z_2$.

Referring to FIG. 10, $EC_{Z1}$ is the largest first metric while $EC_{Z2}$ is greater than $EC_{Z3}$. Similarly, a strictly decreasing region between Z1 and Z2 implies a strictly increasing region between $Z_a$ and $Z_1$. Consequently, it can be determined that an optimized focal plane falls within a second range between $Z_a$ and $Z_2$.

Figure 11:
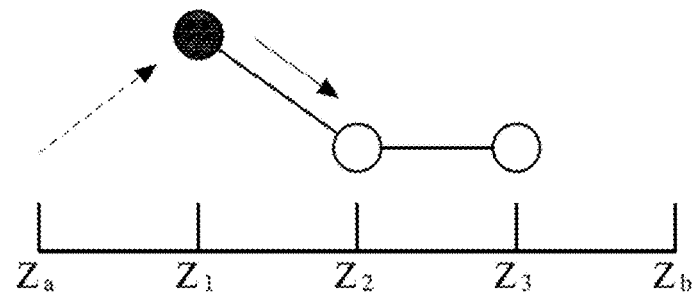
FIG. 11 schematically illustrates a stage of a method for determining an optimized focal place, according to example embodiments.

Furthermore, referring to FIG. 11, ECZ1 is the largest while $EC_{Z2}$ is equal to $EC_{Z3}$. Similarly, it can be determined that an optimized focal plane falls within a second range between $Z_a$ and $Z_2$.

From the above example analysis based on the embodiments illustrated in FIG. 9 to FIG. 11, it is noted that the largest first metric determines a smaller second range, or the second range can be associated with the largest first metric.

Figures 12, 13:
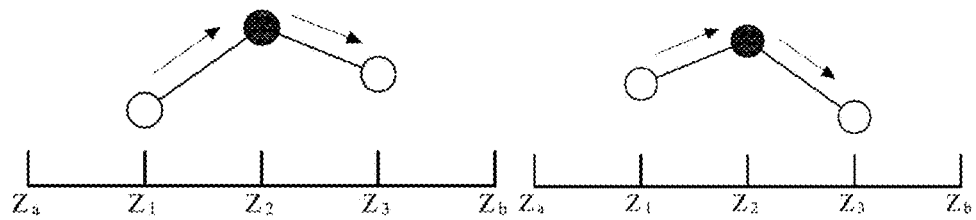
FIG. 12 schematically illustrates a stage of a method for determining an optimized focal place, according to example embodiments.
FIG. 13 schematically illustrates a stage of a method for determining an optimized focal place, according to example embodiments.

Referring to FIG. 12, $EC_{Z2}$ is the greatest first metric while $EC_{Z1}$ is smaller than $EC_{Z3}$. A strictly increasing (shown in a solid arrow) region lies between $Z_1$ and $Z_2$, while a strictly decreasing (shown in another dotted arrow) region lies between $Z_2$ and $Z_3$. It is determined that an optimized focal plane falls within a second range between $Z_1$ and $Z_3$.

Referring to FIG. 13, $EC_{Z2}$ is the greatest first metric while $EC_{Z1}$ is greater than $EC_{Z3}$. Similarly, a strictly increasing region lies between Z1 and Z2, while a strictly decreasing region lies between $Z_2$ and $Z_3$. It is determined that an optimized focal plane falls within a second range between $Z_1$ and $Z_3$.

Figures 14, 15:
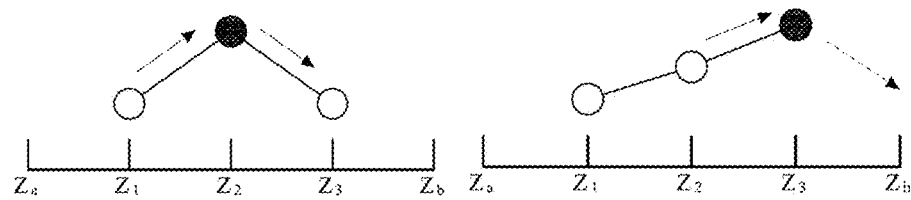
FIG. 14 schematically illustrates a stage of a method for determining an optimized focal place, according to example embodiments.
FIG. 15 schematically illustrates a stage of a method for determining an optimized focal place, according to example embodiments.

Referring to FIG. 14, $EC_{Z2}$ is the greatest first metric while $EC_{Z1}$ is equal to $EC_{Z3}$. Similarly, a strictly increasing region lies between $Z_1$ and $Z_2$, while a strictly decreasing region lies between $Z_2$ and $Z_3$. It is determined that an optimized focal plane falls within a second range between $Z_1$ and $Z_3$.

Referring to FIG. 15, $EC_{Z3}$ is the greatest first metric while $EC_{Z1}$ is smaller than $EC_{Z2}$. A strictly increasing (shown in a solid arrow) region between $Z_2$ and $Z_3$ implies a strictly decreasing (shown in a dotted arrow) region between $Z_3$ and $Z_b$. It is determined that an optimized focal plane falls within a second range between $Z_2$ and $Z_b$.

Figures 16, 17:
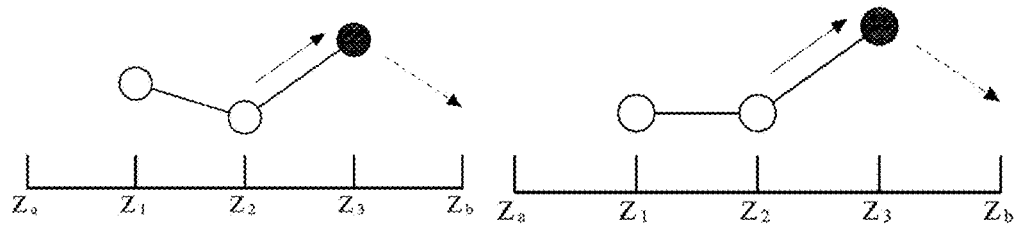
FIG. 16 schematically illustrates a stage of a method for determining an optimized focal place, according to example embodiments.
FIG. 17 schematically illustrates a stage of a method for determining an optimized focal place, according to example embodiments.

Referring to FIG. 16, $EC_{Z3}$ is the greatest first metric while $EC_{Z1}$ is greater than $EC_{Z2}$. Since the slope of the line between $Z_2$ and $Z_3$ is greater than that between $Z_1$ and $Z_2$, the curve formed by $Z_1$, $Z_2$ and $Z_3$ is inclined to climb up rather than climb down. Similarly, a strictly increasing region between $Z_2$ and $Z_3$ implies a strictly decreasing region between $Z_3$ and $Z_b$. It is determined that an optimized focal plane falls within a second range between $Z_2$ and $Z_b$.

Referring to FIG. 17, $EC_{Z3}$ is the greatest first metric while $EC_{Z1}$ is equal to $EC_{Z2}$. Similarly, a strictly increasing region between $Z_2$ and $Z_3$ implies a strictly decreasing region between $Z_3$ and $Z_b$. It is determined that an optimized focal plane falls within a second range between $Z_2$ and $Z_b$.

Figures 18, 19:
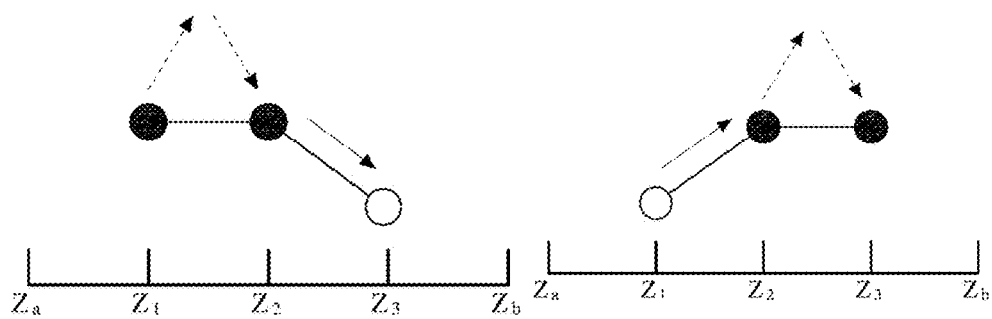
FIG. 18 schematically illustrates a stage of a method for determining an optimized focal place, according to example embodiments.
FIG. 19 schematically illustrates a stage of a method for determining an optimized focal place, according to example embodiments.

Referring to FIG. 18, $EC_{Z1}$ and $EC_{Z2}$ equal to one another are greater than $EC_{Z3}$. A strictly decreasing (shown in a solid arrow) region between $Z_2$ and $Z_3$ implies that a strictly increasing (shown in a dotted arrow) region and also a strictly decreasing (shown in another dotted arrow) region lie between $Z_1$ and $Z_2$. It is determined that an optimized focal plane falls within a second range between $Z_1$ and $Z_2$.

Referring to FIG. 19, $EC_{Z2}$ and $EC_{Z3}$ equal to one another are greater than $EC_{Z1}$. A strictly increasing (shown in a solid arrow) region between $Z_1$ and $Z_2$ implies that a strictly increasing (shown in a dotted arrow) region and also a strictly decreasing (shown in another dotted arrow) region lie between $Z_2$ and $Z_3$. It is determined that an optimized focal plane falls within a second range between $Z_2$ and $Z_3$.

In a second aspect, the present disclosure relates to a computing device for use in an autofocus system for determining a focal plane, the computing device being programmed for executing a method according to embodiments of the first aspect. The computing device may comprise a memory, one or more processors, and one or more programs stored in the memory and configured for execution by the one or more processors.

Embodiments may also relate to an autofocus system comprising a light source for radiating light towards a sample under test and an imager for acquiring a hologram of the sample. Such autofocus system may further comprise a computing device according to example embodiments for determining a focal plane.

FIG. 1 shows a schematic diagram of an autofocus system 100, in accordance with example embodiments. The autofocus system 100 may be used to assist automatic observation functions, such as cell tracking. Particularly, the autofocus system 100 may determine a focal plane, e.g. a focal distance parameter for use in a digital holographic reconstruction method, such that clear reconstructed images may be generated using such reconstruction method in combination with the determined focal plane.

Referring to FIG. 1, an autofocus system 100 in accordance with embodiments may comprise an imaging system 10 and a computing device 20 in accordance with embodiments. In some embodiments, the imaging system 10 may comprise a holographic system that provides one or more holograms of a sample, and computing device 20 may comprise, but is not limited to, a computer configured to process the holograms from the imaging system 10.

The imaging system 10 may include a light source 11 and an imager 14. The light source 11 may radiates light, e.g. at least partially coherent light, towards a sample 12 under test. The optical properties of sample 12 may be revealed by the transmission, scattering and diffraction characteristics of the light as it travels through sample 12. Thus, some embodiments may relate to an imaging system 10 that is configured to acquire a transmission hologram of the sample 12. However, example embodiments may also relate to an imaging system that is configured to acquire a reflection hologram of the sample 12.

Optical information such as the wave-front in complex form of an object in sample 12 may be recorded by imager 14. The imaging system 10 may generate an image 15, for example, a hologram or holographic image including the optical information. Image 15 may include a set of raw data that is not available for visual inspection, e.g. for direct and simple visual interpretation by a human observer, until it is reconstructed. Moreover, imaging system 10 may provide image 15 to computing device 20 for subsequent processing, as will be further discussed.

In some embodiments, light source 11 may include a laser light source or a light emitting diode (LED) light source. Furthermore, sample 12 may include one or more microbiological cells or one or more semiconductor component features. These cells or features, which may be referred to as objects throughout the present disclosure, can be focused at different depths or in different focal planes.

The computing device 20 may include a processor 21 and a memory 22. In some embodiments, processor 21 is a central processing unit (CPU) or part of a computing module. Processor 21 may be configured to execute one or more programs stored in memory 22 in order to perform specific operations to determine optimized focal planes for the objects in sample 12. Accordingly, in response to the image 15 from imaging system 10, computing device 20 may generate an image 16 that includes information on optimized depths or optimized focal planes for the one or more objects in sample 12. Operations or functions of computing device 20 were discussed hereinabove in detail in relation to embodiments of the first aspect.

Although software is employed in computing device 20 in some embodiments, hardware may be used alternatively in other embodiments. Hardware implementation may achieve a higher performance compared to software implementation but at a higher design cost. For real-time applications, due to the speed requirement, hardware implementation is usually chosen. It is to be noted that the operations, functions and techniques described herein may be implemented, at least in part, in hardware, software, firmware, or any combination thereof. For example, various aspects of embodiments according to the present disclosure may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processor," "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, memory 22 may include any computer readable medium, including but not limited to, a random access memory (RAM), read only memory (ROM), programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, memory 22 is incorporated into processor 21.

The computing device 20, in some embodiments, may comprise one or more processors 21, or one or more programs stored in memory 22 and configured for execution by the one or more processors 21. The one or more programs may include instructions for reconstructing a holographic image, identifying objects in the reconstructed image, performing a first edge detection for an object at a depth based on real part of the reconstructed image, performing a second edge detection for the object at the depth based on imaginary part of the reconstructed image, evaluating a first degree of clarity for the object at the depth based on a result of the first edge detection, or evaluating a second degree of clarity for the object at the depth based on a result of the second edge detection.

Moreover, in some embodiments, the one or more programs may include instructions for reconstructing a holographic image, identifying objects in the reconstructed image, performing a first-stage edge detection for an object at a set of predetermined depths in a first range based on real part of the reconstructed image, performing a first-stage edge detection for the object at the set of predetermined depths in the first range based on imaginary part of the reconstructed image, evaluating a first-stage degree of clarity for the object at the set of predetermined depths based on a result each of the first-stage edge detection associated with the real part and imaginary part, or identifying within the first range a second range associated with the optimized focal plane based on the first-stage degree of clarity.

In a third aspect, the present disclosure also relates to a computer program product for, when executed on a computing device in accordance with embodiments of the second aspect, performing a method according to embodiments of the first aspect.

The invention claimed is:

1. An autofocus method for determining a focal plane for at least one object, the method comprising:
reconstructing a holographic image of the at least one object such as to provide a reconstructed image at a plurality of different focal depths,
wherein the reconstructed image comprises a real component and an imaginary component for jointly encoding phase and amplitude information;
performing a first edge detection on the real component for at least two depths of the plurality of different focal depths and a second edge detection on the imaginary component for the at least two depths;
obtaining a first measure of clarity for each of the at least two depths based on a first measure of statistical dispersion with respect to the first edge detection and a second measure of clarity for each of the at least two depths based on a second measure of statistical dispersion with respect to the second edge detection; and determining the focal plane for the at least one object based on a comparison of a scalar measure of clarity for the at least two depths, wherein the scalar measure is based on the first measure of clarity and the second measure of clarity.

2. The method according to claim 1, further comprising identifying the at least one object in the reconstructed image, wherein the following steps are applied to a local region of the reconstructed image corresponding to the at least one object of:

performing the first edge detection and the second edge detection;

obtaining the first measure of clarity and the second measure of clarity; and determining the focal plane for the at least one object.

3. The method according to claim 2, wherein identifying at least on object in the reconstructed image comprises:

digitizing the reconstructed image;

identifying connected regions having a same digitized value; and segmenting each of the connected regions.

4. The method according to claim 2, wherein a plurality of objects are identified, wherein a plurality of focal planes are determined corresponding to the plurality of objects, and wherein the method further comprises stitching image regions corresponding to each of the plurality of objects in the corresponding focal plane together to form a synthetic image that contains each of the plurality of objects.

5. The method according to claim 4, wherein obtaining the first measure of clarity or obtaining the second measure of clarity comprises:

obtaining a gradient magnitude of the result of the first edge detection or the second edge detection; and obtaining a standard deviation value of the gradient magnitude.

6. The method according to claim 1, wherein the first measure of statistical dispersion or the second measure of statistical dispersion comprises a standard deviation.

7. The method according to claim 1, wherein the at least two depths of the plurality of different focal depths comprise depths uniformly distributed in a predetermined range.

8. The method according to claim 7, wherein the depths uniformly distributed in the predetermined range comprise a first quartile, a second quartile, and a third quartile of the predetermined range.

9. The method according to claim 1, further comprising:

determining at least one further depth of the plurality of different focal depths based on the determined focal plane;

repeating the steps of performing the first edge detection and the second edge detection for the at least one further depth;

obtaining the first measure of clarity and the second measure of clarity for the at least one further depth; and adjusting the focal plane based on a scalar measure of clarity for the at least one further depth.

10. The method according to claim 9, wherein the at least two depths are uniformly distributed in a first predetermined range of depths, wherein the at least one further depth comprises depths uniformly distributed in a second range of depths, wherein the second range of depths is narrower than the first predetermined range of depths, and wherein the second range of depths is determined based on the comparison of the scalar measure of clarity for the at least two depths.

11. The method according to claim 1, further comprising:

determining at least one further depth of the plurality of different focal depths based on the determined focal plane;

performing a second-stage edge detection for the at least one further depth based on an amplitude of the reconstructed image; and evaluating a second-stage measure of clarity for the at least one object based on a result of the second-stage edge detection.

12. The method according to claim 1, wherein performing the first edge detection and the second edge detection comprises convolving, respectively, the real component or the imaginary component with a Laplacian mask.

13. A computing device for use in an autofocus system for determining a focal plane for at least one object, the computing device being programmed for executing a method comprising:

reconstructing a holographic image of the at least one object such as to provide a reconstructed image at a plurality of different focal depths, wherein the reconstructed image comprises a real component and an imaginary component for jointly encoding phase and amplitude information;

performing a first edge detection on the real component for at least two depths of the plurality of different focal depths and a second edge detection on the imaginary component for the at least two depths;

obtaining a first measure of clarity for each of the at least two depths based on a first measure of statistical dispersion with respect to the first edge detection and a second measure of clarity for each of the at least two depths based on a second measure of statistical dispersion with respect to the second edge detection; and determining the focal plane for the at least one object based on a comparison of a scalar measure of clarity for the at least two depths, wherein the scalar measure is based on the first measure of clarity and the second measure of clarity.

14. The computing device according to claim 13, wherein the autofocus system comprises:

a light source configured to radiate light toward a sample under test and an image; and an imager configured to acquire a hologram of the sample.

15. A non-transitory, computer-readable medium with instructions stored thereon, wherein the instructions are executable by a processor to perform a method for determining a focal plane for at least one object, the method comprising:

reconstructing a image of the at least one object such as to provide a reconstructed image at a plurality of different focal depths, wherein the reconstructed image comprises a real component and an imaginary component for jointly encoding phase and amplitude information;

performing a first edge detection on the real component for at least two depths of the plurality of different focal depths and a second edge detection on the imaginary component for the at least two depths;

obtaining a first measure of clarity for each of the at least two depths based on a first measure of statistical dispersion with respect to the first edge detection and a second measure of clarity for each of the at least two depths based on a second measure of statistical dispersion with respect to the second edge detection; and determining the focal plane for the at least one object based on a comparison of a scalar measure of clarity for the at least two depths, wherein the scalar measure is based on the first measure of clarity and the second measure of clarity.

16. The non-transitory, computer-readable medium according to claim 15, wherein the method further comprises identifying the at least one object in the reconstructed image, wherein the following steps are applied to a local region of the reconstructed image corresponding to the at least one object of:

performing the first edge detection and the second edge detection;

obtaining the first measure of clarity and the second measure of clarity; and determining the focal plane for the at least one object.

17. The non-transitory, computer-readable medium according to claim 16, wherein identifying the at least one object in the reconstructed image comprises:

digitizing the reconstructed image;

identifying connected regions having a same digitized value; and segmenting each of the connected regions.

18. The non-transitory, computer-readable medium according to claim 16, wherein a plurality of objects are identified, wherein a plurality of focal planes are determined corresponding to the plurality of objects, and wherein the method further comprises stitching image regions corresponding to each of the plurality of objects in the corresponding focal plane together to form a synthetic image that contains each of the plurality of objects.

19. The non-transitory, computer-readable medium according to claim 15, wherein the first measure of statistical dispersion or the second measure of statistical dispersion comprises a standard deviation.

20. The non-transitory, computer-readable medium according to claim 15, wherein the at least two depths of the plurality of different focal depths comprise depths uniformly distributed in a predetermined range.

* * * * *